United States Patent [19]
Scarr

[11] Patent Number: 6,074,124
[45] Date of Patent: Jun. 13, 2000

[54] LOG BOOM APPARATUS AND METHOD UTILIZING OPEN-SIDED HOOK

[76] Inventor: William Danny Scarr, 1361 Discovery Avenue, Nanaimo, Bristish Columbia, Canada, V9F 4B5

[21] Appl. No.: 09/102,818

[22] Filed: Jun. 23, 1998

[51] Int. Cl.[7] ...................................................... F16B 2/14
[52] U.S. Cl. .................... 403/374.1; 403/211; 24/136 R; 441/52
[58] Field of Search ................................ 403/211, 374.1, 403/373, 409.1, 334; 24/136 R, 115 M; 441/47, 50, 52; 294/102.1

[56] References Cited

U.S. PATENT DOCUMENTS

| | | | |
|---|---|---|---|
| 1,201,169 | 10/1916 | Goepel | 24/136 R |
| 1,644,375 | 10/1927 | Haworth | 403/211 |
| 1,644,376 | 10/1927 | Haworth | 403/211 |
| 2,085,333 | 6/1937 | Reynolds | 403/211 |
| 2,977,654 | 4/1961 | Page | 403/211 |
| 3,350,750 | 11/1967 | Scarr et al. | 403/211 |
| 3,766,610 | 10/1973 | Thorsbakken | 24/115 R |
| 3,819,287 | 6/1974 | Exelsson et al. | 403/211 |
| 3,824,653 | 7/1974 | Sholler | 294/102.1 X |
| 3,905,711 | 9/1975 | Rogers | 24/115 M X |
| 4,561,154 | 12/1985 | Briscoe et al. | 403/211 X |
| 4,602,891 | 7/1986 | McBride | 403/211 |
| 5,119,529 | 6/1992 | Kaye | 24/136 R |
| 5,148,579 | 9/1992 | Dyck et al. | 24/136 |
| 5,228,653 | 7/1993 | Libert | 248/63 |
| 5,392,496 | 2/1995 | Johnson | 24/136 |

FOREIGN PATENT DOCUMENTS

| | | | |
|---|---|---|---|
| 1158422 | 12/1983 | Canada | 24/136 R |
| 1279463 | 1/1991 | Canada . | |
| 2018715 | 6/1993 | Canada . | |
| 2020355 | 6/1994 | Canada . | |

Primary Examiner—Harry C. Kim
Attorney, Agent, or Firm—Norman M. Cameron

[57] ABSTRACT

A cable connector has a body with a passageway therethrough and a slot extending along the passageway. A wedge is slidably received in the passageway. A log boom is secured by connecting the body of the connector to one end of the cable, wrapping the cable about a log on one side of the boom and then inserting the cable through the slot into the passageway. A wedge is then driven into the passageway to secure the hook to the cable.

12 Claims, 4 Drawing Sheets

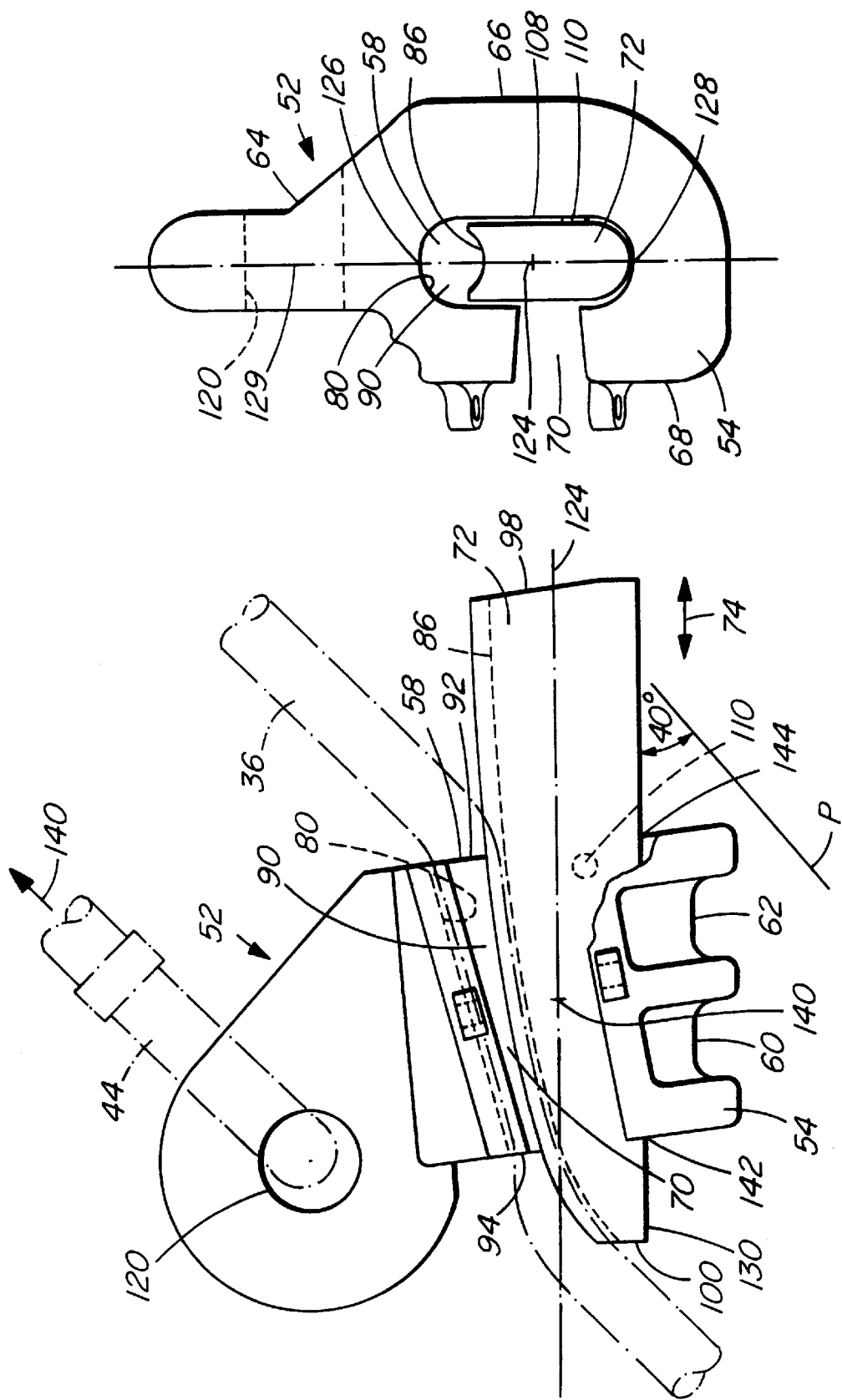

LOG BOOM APPARATUS AND METHOD UTILIZING OPEN-SIDED HOOK

BACKGROUND OF THE INVENTION

This invention relates to log boom apparatuses and, in particular, hooks and cables utilized for securing log booms together.

Log booms are an arrangement of a series of logs connected together, typically by cables or chains, which are used to confine a plurality of logs to hold them in position or allow them to be towed to a different location, by a tug boat for example.

One type of log boom includes two outside logs, usually called "boom sticks", which are connected together by a connection known as a "swifter". The swifter may be a log which is pulled across the boom, but this requires the boom width to be standardized and flat-topped, which limits the number of logs which can be floated in the boom.

Alternatively, the swifter may be a cable, typically ¾ inch wire rope, conventionally utilizing two different types of hooks. One end of the line has a choke type hook. This hook slides on the line and an eye at the end of the cable is passed around one of the boom sticks and attached to the choke hook by means of a pin and cotter key assembly. This is then tightened onto the stick.

The other end of the conventional swifter line has a wedge type hook. The cable passes through an opening in the wedge hook, while the eye on the end of the swifter is passed around a boom stick and attached to the wedge hook by a pin and cotter key assembly. The wedge hook is then pulled across the boom towards the opposite side, thus tightening it. When tight, the wedge is driven home on the cable to secure the line in place.

Swifter lines or cables are lighter, more flexible and more easily transported and adjusted than swifter logs. They can be used over bundles of logs, thus allowing more logs to be held in a boom. They can be recycled and repaired relatively easily. However the largest drawback is that the wedge end of the swifter must have a substantial length of clear, kink free wire with no repairs in order for the wedge type hook to slide up the line for tightening. Typically this requires 60 feet of such clear, kink free cable. The choke end of the swifter must have 20–30 feet of clear line for it to work properly. These factors considerably add to the cost of repair as quite often large amounts of cable have to be added to the swifter to effect a repair. Another disadvantage is that pin and cotter assemblies can easily become lost and, in many cases, bend or break the hook during use.

Cable connectors with slots for receiving cables are known. An example is the Tension Clamp disclosed in U.S. Pat. No. No. 5,228,653 to Libert. However, the device is intended for use on an insulated conductor and thus does not grip the cable as tightly as necessary for a log boom.

Other examples of hooks or the like with slots for receiving cables are U.S. Pat. No. 5,148,579 to Dyck et al. and Canadian Patent No. 2,020,355 to Dyck et al., 2,018,715 to Kaye and 1,279,463 to George E. Scarr. Typically these devices simply squeeze the cable and do not provide enough resistance to prevent the cable from moving through the hook as would be desirable. Also they do not have suitable connectors. For example, the eye shown in Canadian Patent No. 1,279,463 is simply a carrying handle and not a cable attachment. Other related patents include U.S. Pat. No. 5,392,496 to Johnson, U.S. Pat. No. 4,602,891 to McBride, U.S. Pat. No. 3,819,287 to Axelsson et al. and U.S. Pat. No. 3,766,610 to Thorsbakken.

None of these patents discloses a hook attachment which is well adapted for use on swifter lines and which overcomes the stated deficiencies in the prior art.

Accordingly it is an object of the invention to provide an improved log boom securing apparatus which does away with the need for long unbroken lengths of cable required by prior art hooks.

It is also an object of the invention to provide an improved apparatus and method for log booms which allows log booms to be secured quickly, economically and safely.

It is a further object of the invention to provide an improved apparatus and method for securing log booms with swifters which is simple and economical to produce and sell and is, at the same time, robust in construction.

SUMMARY OF THE INVENTION

In accordance with these objects, there is provided a cable connector, comprising a body with a passageway therethrough and having a cable receiving first surface for receiving a cable extending through the passageway. There is a slot extending along the passageway and outwardly through the body. A wedge is slidably received in the passageway and has a large end, a small end and a cable receiving second surface which is non-parallel with the first surface, forming a tapered cavity between the first surface and the second surface. The cavity decreases in size as the large end of the wedge slides towards the body, whereby a cable is pinched between the first and second surfaces.

Preferably the second surface is roughened. It may have diagonal groves. The second surface may be longitudinally convex.

The body may have means thereon for connecting another cable to the body. The means may be an eye. The passageway may have a longitudinal center line, the eye being aligned with the center line.

There is also provided, according to another aspect of the invention, an apparatus for securing a log boom having two outer logs and a plurality of logs therebetween. The apparatus includes a cable extending between the two outer logs and having a first end. There is a cable connector having a body with a cavity. The first end of the cable is connected to the body. The cable extends through the cavity to form a loop around one of the outer logs.

There may be a second cable connector, the second end of the cable being connected to another said outer log by the second connector.

There is also provided, according to a further aspect of the invention, a method of securing a log boom having outer logs. The method comprises the steps of connecting a cable, near a first end thereof, to a first outer log on one side of the boom. A hook is connected to the cable near a second thereof. The hook has a passageway therethrough and slot extending along the passageway. The cable is wrapped over logs secured by the boom and about a second outer log on a second side of the boom which is opposite the one side. The hook is pulled towards the one side of the boom. The cable is inserted through the slot into the passageway. A wedge is driven into the passageway to secure the hook along the cable.

BRIEF DESCRIPTION OF THE DRAWINGS

In the drawings:

FIG. 3 is a side elevation of one of the hooks and associated wedge as well as fragments of a cable connected thereto;

FIG. 4 is a end view of the hook of FIG. 3;

DETAILED DESCRIPTION OF THE PREFERRED EMBODIMENTS

Figure 1:
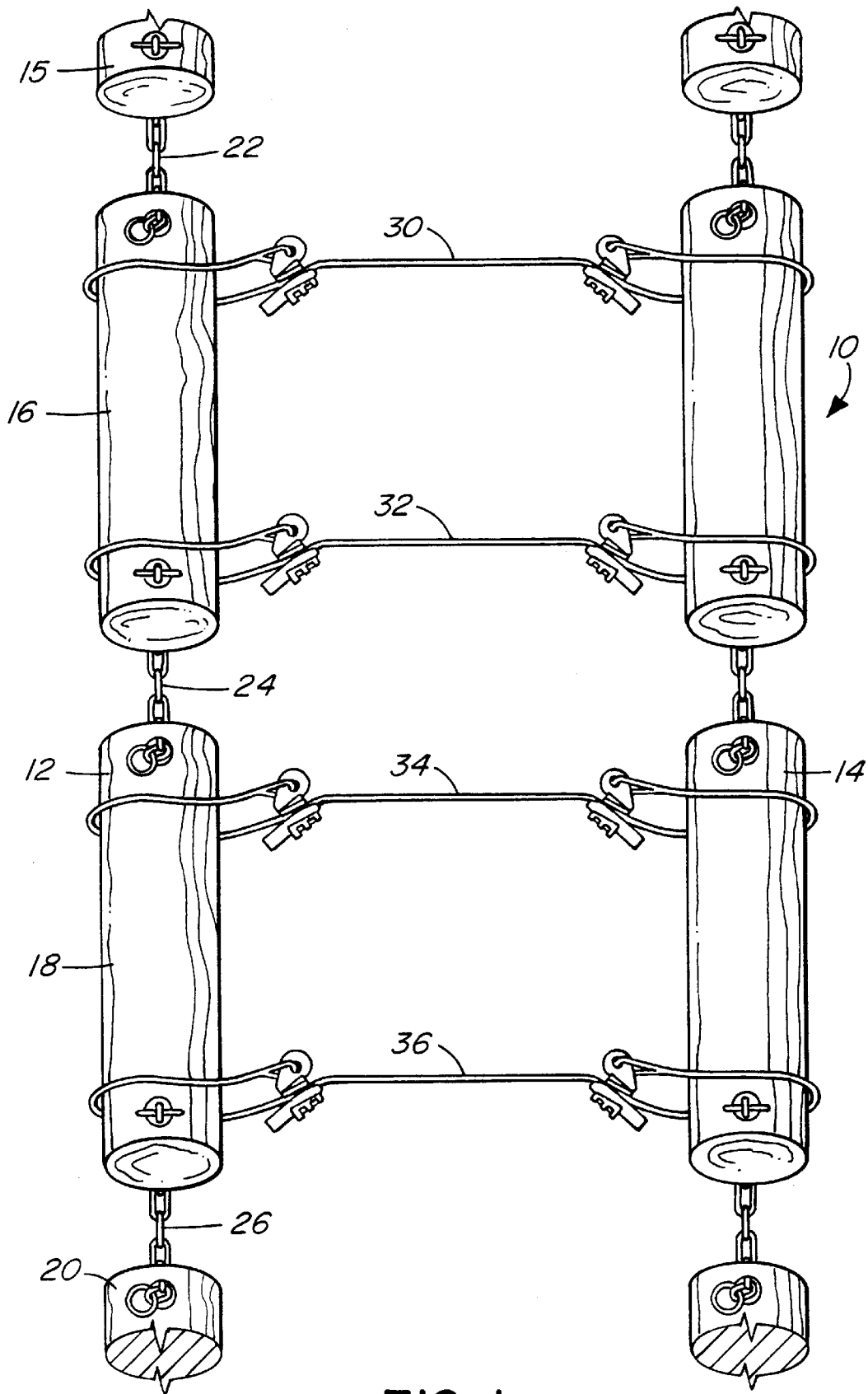
FIG. 1 is a top plan view of a log boom according to an embodiment of the invention.
Figure 2:
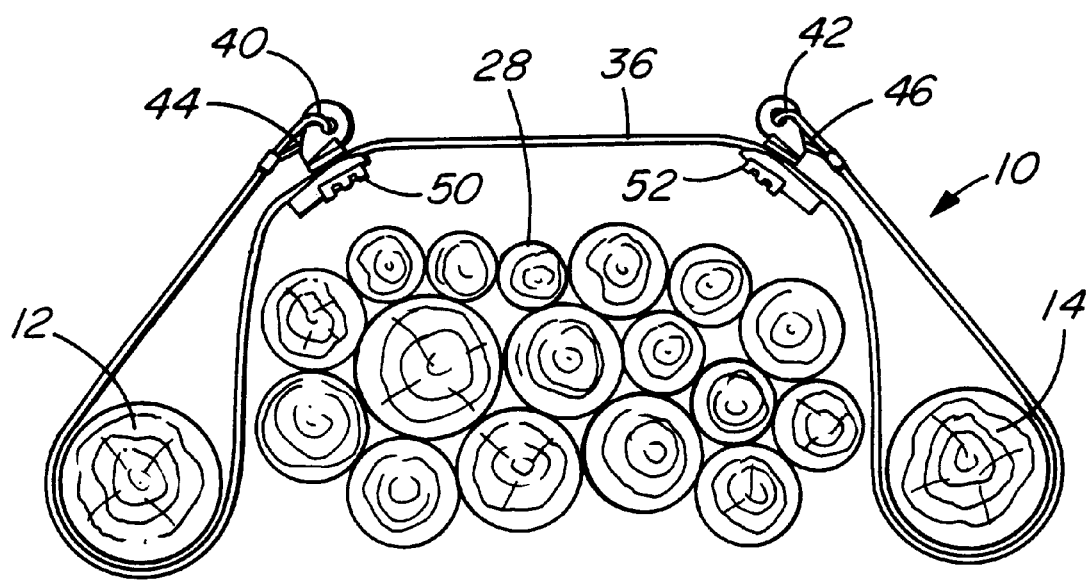
FIG. 2 is an end view thereof.

Referring to the drawings, and first to FIG. 1 and 2, these show a log boom 10 which includes outer logs or boom sticks 12 and 14. Each boom stick comprises a series of aligned logs such as logs 15, 16, 18 and 20 for boom stick 12. These are connected together by a series of chains 22, 24 and 26 for each of the boom sticks. A plurality of logs 28 are retained between boom sticks as shown in FIG. 2.

A plurality of swifter lines 30, 32, 34 and 36 interconnect the boom sticks and retain the logs 28 between the boom sticks. Swifter line 36, shown in better detail in FIG. 2, is a cable, ¾ inch in diameter in this particular example. The cable has a first end 40 and a second end 42, having eyes 44 and 46 formed thereon. The eyes connect the ends of the cable to hooks 50 and 52 respectively.

Hook 52 is shown in better detail in FIG. 3. Hook 50 is identical. Each hook has a body 54 with a passageway 58 extending therethrough. The body is generally oval-shaped when viewed from the end as seen in FIG. 4. There are two deep grooves 60 and 62 adjacent to the passageway 58. These extend about the body to a point 64 on side 66. They terminate on side 68 adjacent a slot 70 which extends along the passageway 58 and outwardly through the body. A wedge 72 is slidably received in the passageway for movement in the directions indicated by arrows 74 in FIG. 3.

The body has a cable receiving first surface 80 which receives one side of the cable 36 extending through the passageway. This would be the top of the cable 36 from the point of view of FIG. 3. Wedge 72 has a cable receiving second surface 86 which receives the bottom of cable 36 from the point of view of FIG. 3. The surfaces 80 and 86 are non-parallel as seen in FIG. 3. The two surfaces therefore form a tapered cavity 90 having a larger first end 92 and a smaller second end 94 as shown in FIG. 3.

Figure 5:
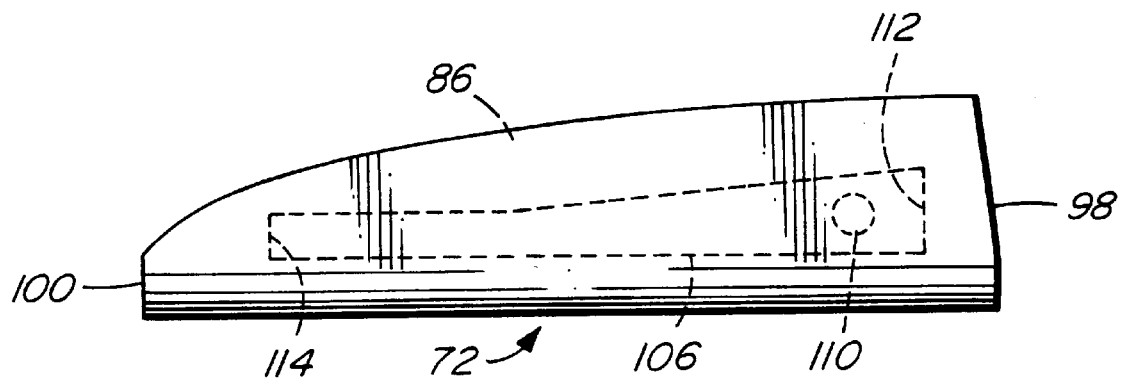
FIG. 5 is a side elevation of the wedge thereof.
Figure 6:
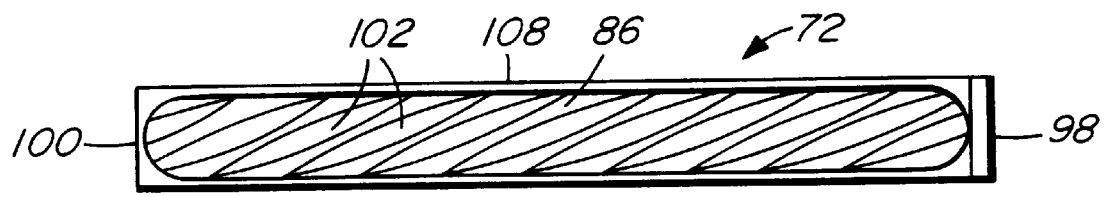
FIG. 6 is top plan view of the wedge.
Figure 7:
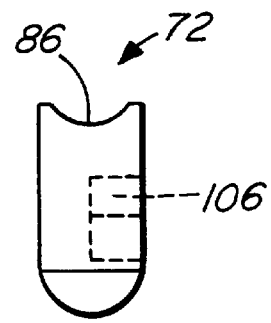
FIG. 7 is an end view of the wedge.

The wedge 72 is shown in better detail in FIG. 5–7. The wedge has a large end 98 and a small end 100. It may be seen that the cable receiving second surface 86 is roughened, having a series of diagonal grooves 102 as seen in FIG. 6. These receive the diagonally wound strands of the cable and thus help grip the cable. Also the surface 86 is transversely concave as seen best in FIG. 7. It is longitudinally convex as seen in FIG. 5. The surface is sloped near the small end 100 of the wedge. These features conform to the shape of the cable when the device is in use as described below.

There is a recess 106 on side 108 of the wedge which is opposite the slot 70 when the wedge is positioned in the passageway 58. A pin 110, shown in FIG. 3 and 4, is connected to the body of the hook and extends into the recess. The recess ends at a shoulder 112 at one end. and a shoulder 114 at the opposite end of the slot. The pin hits these shoulders when the wedge is moved and thus retains the wedge in the passageway while allowing it to slide back and forth.

The hook has an eye 120 connected to the body 54. As seen best in FIG. 4, the eye is aligned with longitudinal center line 124 of the passageway 58. It is also aligned with longitudinal center line 126 along surface 80 which is on the top of the passageway from the point of view of FIG. 3 and 4. The passageway similarly has a bottom, extending parallel to surface 130 of the wedge 72, which has a longitudinal center line 128. The eye is aligned with this center line as well as an axis 129 extending through both.

The passageway has a center 140 midway between its ends 142 and 144 as seen in FIG. 3. It may be seen that the eye 120 is offset with respect to center 140 of the passageway. The offset is to the side of the center which is opposite large end 98 of the wedge when cable 36 is pinched between first surface 80 of the passageway and second surface 86 of the wedge as shown in FIG. 3.

It may be seen best in FIG. 3 that the first end 144 of the passageway is larger than its second end 142. The wedge is initially inserted through the first end 144 and is moved towards the second end 142 to pinch the cable. This occurs because the surfaces 86 and 80 are non-parallel. The cable is not merely compressed between two parallel surfaces as in the prior art.

In use, each of the cables, for example, cable 36 in FIG. 2, is first connected to an outer log on one side of the boom. For example in this case the cable is first connected to log 14 on one side of the boom adjacent end 42 of the cable. The cable is wrapped about the log with hook 52 connected to eye 46 of the cable. The cable is then inserted through slot 70 of hook 52 and wedge 72 of the hook is driven into the passageway 58 to hold the hook in position along the cable. It should be understood, however, that this first end of the cable could be connected to the log by other means including more convention cable connectors.

Hook 50 is connected to the cable near its second end 40 employing eye 44 of the cable extending through eye 120 of hook 50. The cable is wrapped about log 12 which is on the side of boom 10 opposite log 14. The cable 36 is then inserted through the slot 70 into passageway 58 of hook 50. The hook 50 is pulled towards the log 14 at the first side of the boom. This can be done, for example, with a winch. When the cable is properly tensioned, wedge 72 is driven into the passageway to secure the hook along the cable. When the tension is relieved, the tension on the cable at eye 44, indicated by arrow 140 in FIG. 3, causes the hook to tilt, thus kinking cable 36 as shown. This tilting is caused by the fact that eye 120 is spaced-apart from the passageway and the effect is accentuated by the offset of eye 120 from the center 140 of the passageway as shown in FIG. 3. An angle of tilt of approximately 40° is typically achieved as shown in FIG. 3 where P is a plane parallel to the main span of the cable.

It should be noted that the longitudinally convex shape of surface 86 of the wedge and its tapering adjacent end 100 conforms to the shape of the cable thus kinked, and therefore offers more bearing surface so as not to distort the shape of the cable under load. This also assists the grip on the cable together with the concave surface 86 when viewed from the end and the grooves 102 shown on FIG. 6.

The other cables on the boom are similarly secured in place. When it is desired to disassemble the boom, the wedges are removed by driving them out of the passageways 58 by striking their small ends 100. One wedge can be released on each cable to relieve the tension. The cables can then be slipped out of the slot 70 and removed.

It will be understood by someone skilled in the art that many of the details described above are by way of example only and are not intended to limit the scope of the invention which is to be interpreted with reference to the following claims.

What is claimed is:

1. A cable connector comprising:

a body with a passageway therethrough having a cable receiving first surface for receiving a cable extending through the passageway, a slot extending along the passageway and outwardly through the body, said passageway having a first end and a second end, the first end being larger than the second end; and a wedge slidably received in the passageway having a large end, a small end and a cable receiving second surface which is non-parallel with the first surface, forming a tapered cavity between the first surface and the second surface, the cavity decreasing in size as the large end of the wedge slides towards the body, whereby the cable is pinched between the first and second surfaces, the small end of the wedge being inserted in a direction moving from the first end of the passageway towards the second end of the passageway.

2. A connector as claimed in claim 1, wherein the second surface is roughened.

3. A cable connector as claimed in claim 2, wherein the second surface is transversely concave.

4. A cable connector as claimed in claim 3, wherein the second surface has diagonal grooves.

5. A cable connector as claimed in claim 1, wherein the second surface is longitudinally convex.

6. A cable connector as claimed in claim 1, wherein the body has means for preventing the wedge from sliding completely out of the passageway.

7. A connector as claimed in claim 1, wherein the body has means thereon for connecting another cable to the body.

8. A connector as claimed in claim 7, wherein the means for connecting is an eye.

9. A connector as claimed in claim 8, wherein the passageway has a longitudinal center line, the eye being aligned with the center line.

10. A connector as claimed in claim 9, wherein the passageway has a top with a longitudinal center line and a bottom with a longitudinal center line, the eye being aligned with an axis extending through both said center lines.

11. A connector as claimed in claim 10, wherein the passageway has two ends and a center midway between the ends, the eye being on a side of the center opposite the large end of the wedge when the cable is pinched between the first surface and the second surface.

12. A connector as claimed in claim 1, wherein the small end of the wedge is tapered.

* * * * *